Sept. 3, 1957   B. GARRARD   2,804,958
BOTTLE VENDING MACHINE
Filed Jan. 25, 1954   7 Sheets-Sheet 1

INVENTOR.
BRUCE GARRARD
BY John W. Ralls
HIS ATTORNEY

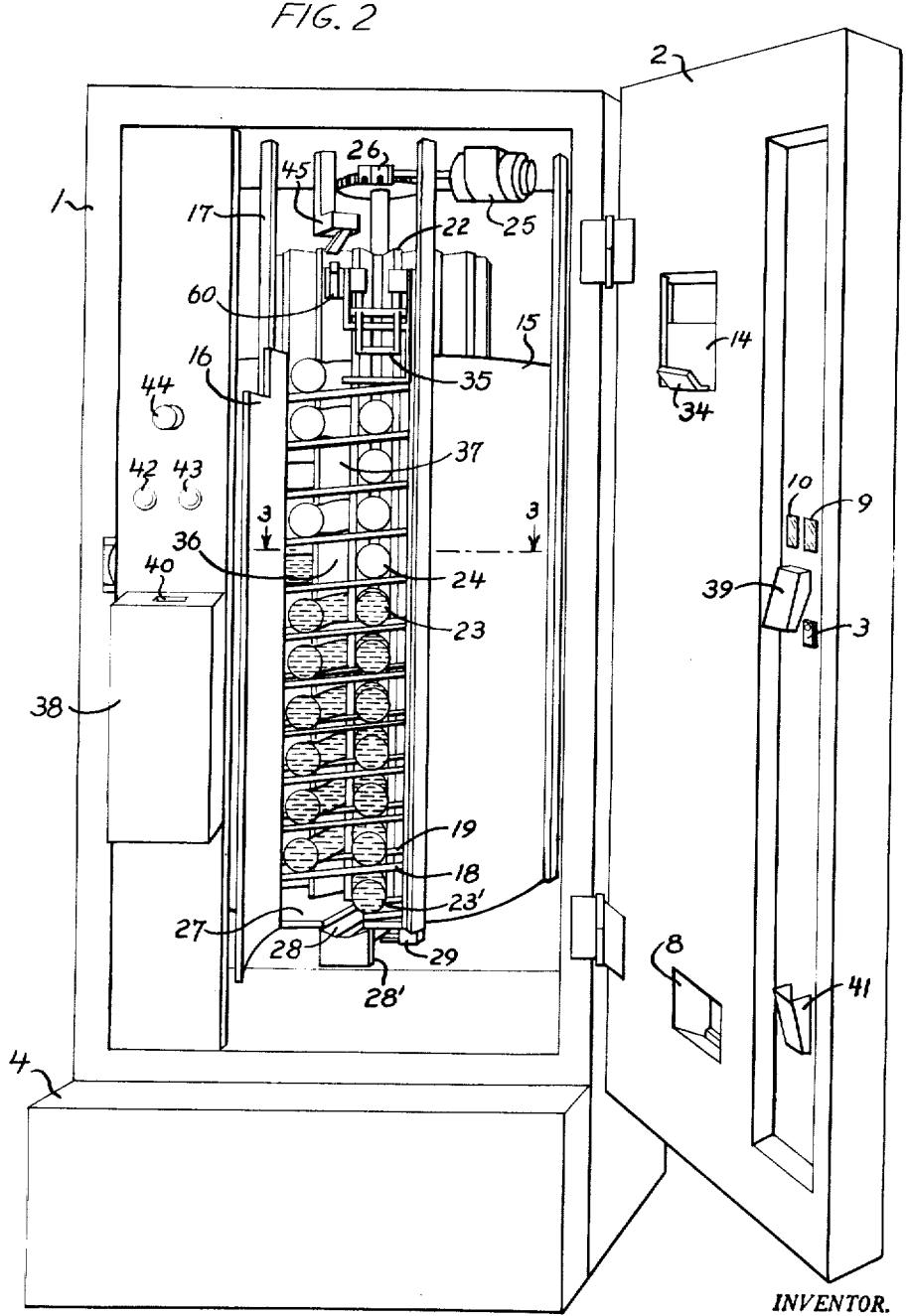

INVENTOR.
BRUCE GARRARD
HIS ATTORNEY

Sept. 3, 1957     B. GARRARD     2,804,958
BOTTLE VENDING MACHINE

Filed Jan. 25, 1954     7 Sheets-Sheet 4

INVENTOR.
BRUCE GARRARD
BY John W. Ralls
HIS ATTORNEY

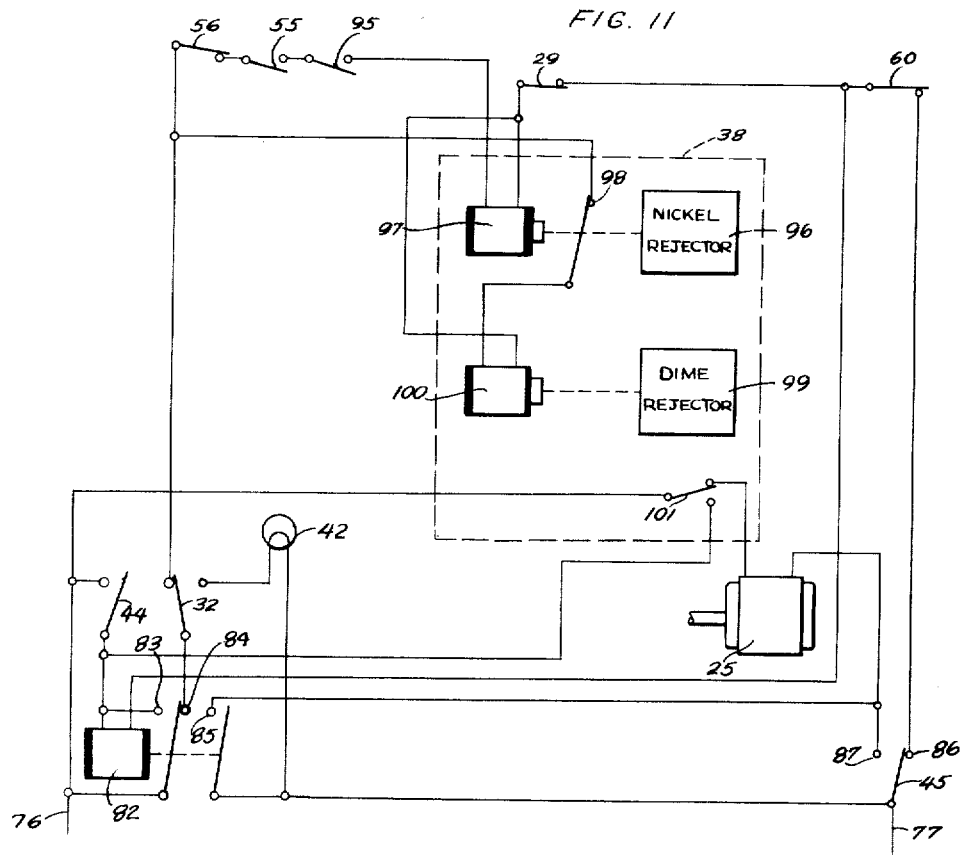
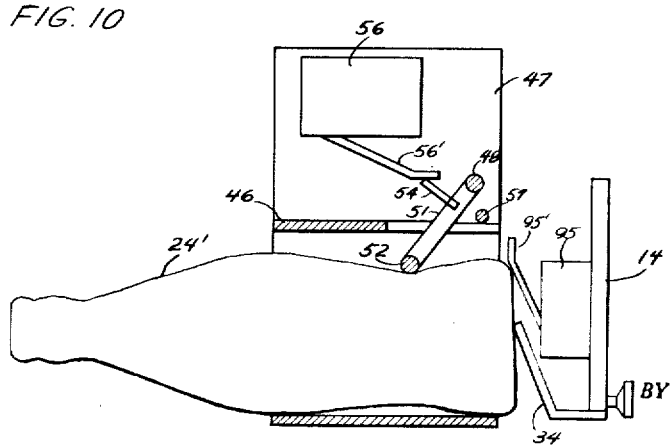

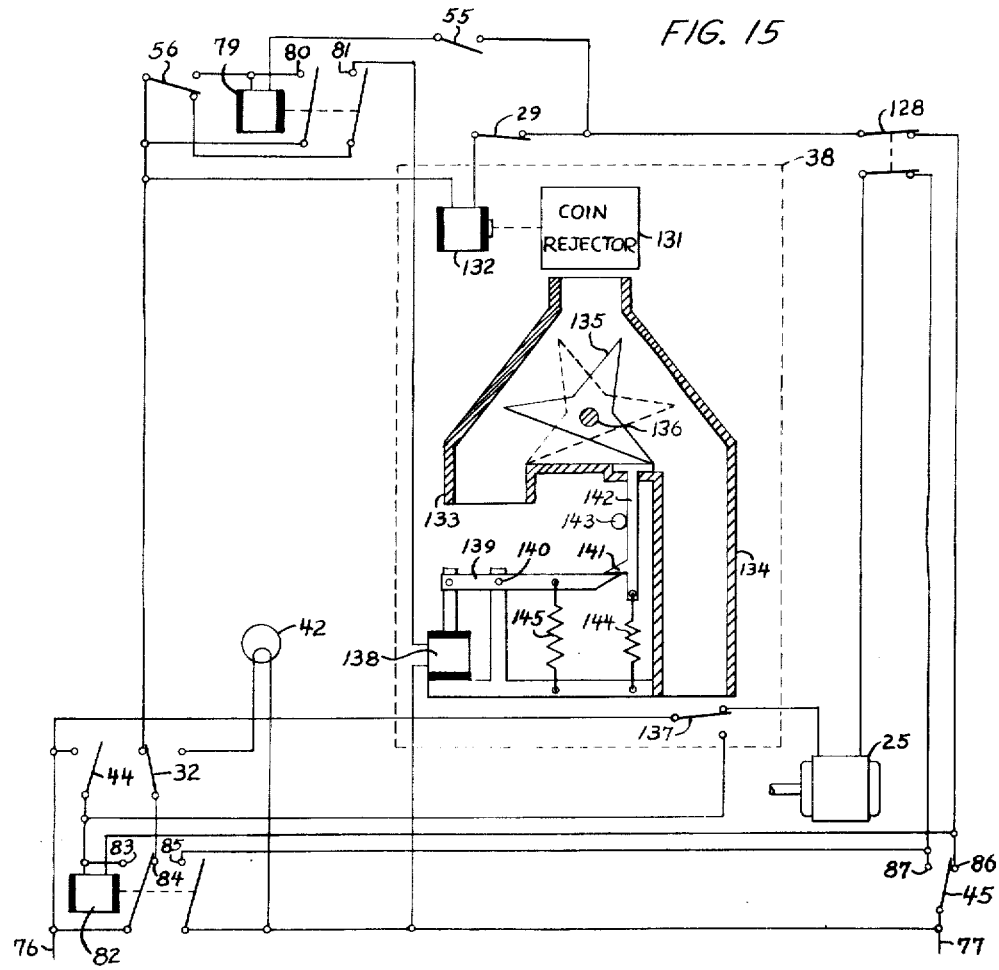

2,804,958
Patented Sept. 3, 1957

United States Patent Office

2,804,958

BOTTLE VENDING MACHINE

Bruce Garrard, Atlanta, Ga.

Application January 25, 1954, Serial No. 405,919

25 Claims. (Cl. 194—4)

This invention relates to coin-operated machines for vending bottled beverages and the like, and its principal object is to provide improved vending machines having provisions for insuring the return of empty bottles or payment therefor. Other objects and advantages will become apparent as the description proceeds.

In the preferred embodiments of my invention, I employ a vending machine of the type having a spiral ramp for the storage of bottles to be vended in which the bottles are advanced downward along the spiral ramp by the vending mechanism into a delivery chute at the bottom of the ramp. I have found that this type of machine is ideal for the incorporation of empty bottle return provisions, since empty bottles may be inserted at the top of the spiral ramp and stored in spaces vacated by the full bottles as the machine is operated. This arrangement leads to a compact, economical machine, since additional storage space for the empty bottles is not required. However, it will be appreciated that certain principles and features of my invention in its broader aspects are useful with other types of vending machines.

My invention will be better understood from the following description taken in connection with the accompanying drawings, and its scope will be pointed out in the appended claims. In the drawings, Fig. 1 is a front perspective view of a vending machine embodying principles of my invention;

Fig. 2 is a front perspective view, drawn to a larger scale, of the same machine with its service door open;

Fig. 10 is a schematic view of another alternative empty bottle detector mechanism;

Fig. 11 is another alternative circuit diagram;

Fig. 14 is a schematic view of another alternative empty bottle detector mechanism; and Fig. 15 is another alternative circuit diagram.

Figure 1:
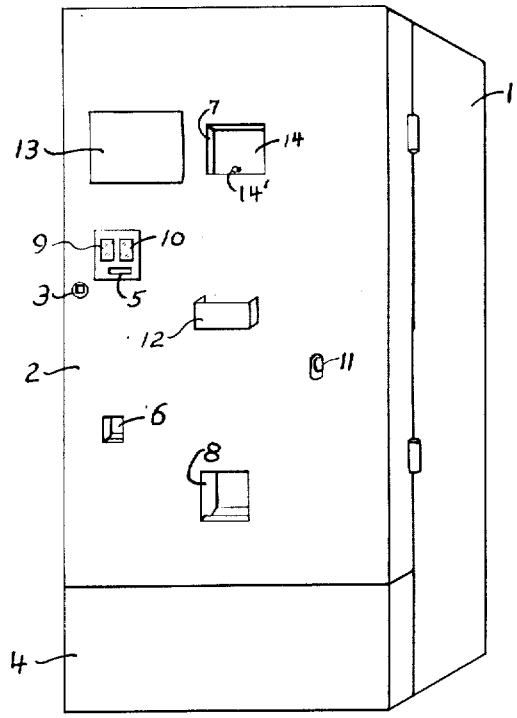

Referring now to Fig. 1, a preferred embodiment of my invention comprises an upright cabinet 1 having a service door 2 which may be opened to refill the machine or service the vending mechanism. At other times door 2 is locked closed by any suitable lock mechanism 3. A lower compartment 4 of the cabinet may contain any suitable refrigerating mechanism for cooling the bottles to be vended. The front of service door 2 is provided with an opening 5 for the insertion of coins, an opening 6 for the delivery of rejected coins and change, an opening 7 for the endwise insertion of empty bottles, an opening 8 for the delivery of full bottles, a pair of translucent windows 9 and 10 which may be respectively illuminated by signal lamps referred to hereinafter, a bottle opener 11 of a conventional type, a small bottle storage rack 12, and a card 13 on which operating instructions for the machine may be printed. A door 14 is slidable vertically to open or close opening 7 selectively. A knob 14' may be provided to facilitate manual operation of door 14. Mechanism within the cabinet, hereinafter described, operates to deliver a full bottle of beverage at opening 8 upon insertion of a first amount of coins into opening 5, without the return of an empty bottle, or upon insertion of an empty bottle into opening 7 and insertion of a second smaller amount of coins into opening 5.

The rack 12 provides a useful storage space for a small number of bottles. It is useful, for example, when a user of the machine has several empty bottles which he wishes to exchange for full bottles. While each bottle is being exchanged, the remaining bottles may be stored in the rack 12. It is also useful when a user has an empty bottle which he does not wish to exchange or to carry away. The bottle may be left in rack 12, so that it may be used by the next user who desires a full bottle but does not have an empty bottle to exchange. Since any empty bottles left in rack 12 usually will be redeemed promptly by a subsequent user of the machine, there is little tendency for bottles to accumulate, and a small rack, holding four bottles for example, is adequate for most installations.

Figure 3:
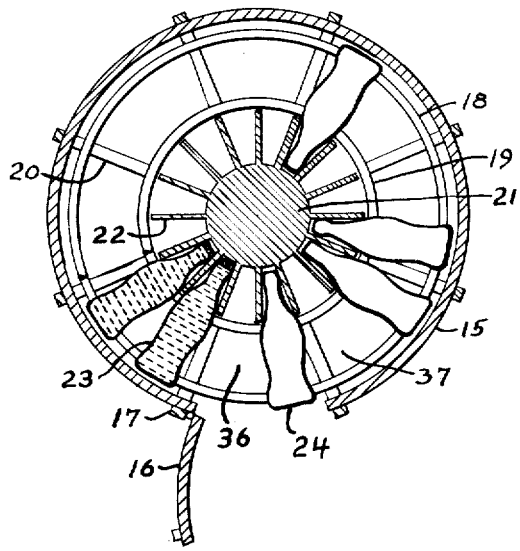
Fig. 3 is a section taken generally along the line 3—3 of Fig. 2.

As shown in Figs. 2 and 3, the cabinet 1 contains a bottle storage magazine preferably enclosed by a cylindrical metal shell 15 having a hinged front portion 16 forming an interior door which may be opened to refill or service the machine. A plurality of posts 17, suspended from the top of the cabinet, support the shell. Inside the cylindrical shell there is a stationary spiral ramp comprising two spiral rods 18 and 19 supported by a plurality of radial brackets 20 extending inwardly from shell 15.

Inside and coaxial with the spiral ramp, there is a rotatable drum 21 having a plurality of radial fins 22 extending outward therefrom to form a plurality of vertical channels. The bottles of beverage are stored along the length of the spiral ramp, with the rods 18 and 19 supporting the body portions of the bottles and with the bottle necks extending into and engaging the channels between the fins 22, as shown. In the drawings, the shaded bottles 23 represent bottles filled with beverage which are to be vended by the machine, while the unshaded bottles 24 represent empty bottles which have been returned to the machine.

In each vending operation of the machine, drum 21 is rotated clockwise (as viewed in Fig. 3) by a vending motor 25 and gear mechanism 26 a distance equal to the angular spacing between fins 22, for example, one-sixteenth revolution when there are sixteen fins as shown in the drawings. This moves each bottle downward along the spiral ramp one bottle position. During each such operation, the bottle 23' at the lower end of the ramp moves over an opening in a lower plate 27 and falls into a delivery chute 28. The chute 28 is pivoted at its rear end, so that the weight of the bottle swings chute 28 downward, and the bottle slides forward until its butt enters delivery opening 8 at the front of the machine. When the bottle is removed, chute 28 is returned by a spring (not illustrated) to the position shown, and the large vertical portion 28' at the front of chute 28 closes opening 8. A switch 29 is arranged to be opened whenever chute 28 is lowered, for purposes hereinafter explained.

Figure 4:
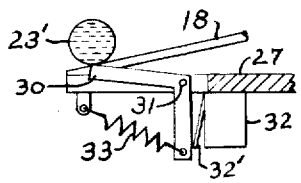
Fig. 4 is a schematic view of the "empty" switch mechanism of the same machine.

As shown in Fig. 4, the bottle 23' adjacent to the lower end of the ramp depresses a lever 30 located within a slot in lower plate 27 and pivoted at 31. This operates arm 32' of a double-throw "empty" switch 32 to close one set of the switch contacts whenever a bottle is in position to be vended. When the last full bottle has been vended, the bottle space adjacent to the end of the ramp is empty, and a spring 33 rotates lever 30 clockwise and thereby operates switch arm 32' to open the previously closed switch contacts and close another set of contacts at switch 32.

Since all of the bottles are moved downward along the ramp each time the machine is operated, each operation clears the bottle space at the top end of the ramp, adjacent to opening 7 of the cabinet, so that an empty bottle may be inserted therein. As shown in Figs. 1 and 2, a vertically sliding door 14 is provided at the front of the machine which may be opened upward for the insertion of empty bottles. A cam 34 preferably is attached to the back or inner side of the door 14 so that it engages the butt of the inserted bottle as the door is closed (see Fig. 6) and thus insures that the empty bottle is fully inserted into the first space of the magazine. An empty bottle detector, indicated generally at 35 in Fig. 2 and hereinafter more fully described, is provided to detect whether or not an empty bottle of the desired size and shape has been inserted.

In Figs. 2 and 3, the bottle space 36, which follows the last full bottle in its movement down the ramp, was left empty when the machine was filled to provide proper operation of "empty" switch 32 after the last full bottle has been vended. The empty spaces 37 are a result of vending operations in which a larger payment has been made in lieu of an empty bottle, as is hereinafter more fully explained.

Coin mechanisms of various types may be used to initiate the vending operation. For example, a substantially conventional change-making mechanism, hereinafter more fully described, may be enclosed within the box 38, Fig. 2. Coins inserted in the opening 5 at the front of the machine pass through a coin chute 39 and enter the coin mechanism at 40. Rejected coins and change are delivered from the bottom of the coin mechanism through a funnel 41 to opening 6.

Signal lamps 42 and 43, which are respectively lighted when the machine is empty and when the change mechanism is not operating, respectively illuminate windows 9 and 10. Push-button switch 44 provides manually controlled means for operating the vending motor 25 to rotate drum 21 for the purpose of facilitating the filling and servicing of the machine. A switch 45, located adjacent to the top of the drum 21 is operated each time a fin 22 passes under the switch arm. Switch 45 controls the end of each vending operation, as is hereinafter explained.

From the above description, it will be noted that the rotatable drum 21, and the stationary spiral ramp 18—19 around the periphery of the drum, form a magazine having a plurality of successive bottle storage spaces disposed substantially from the top to the bottom of the ramp; that the vending mechanism including motor 25 provides means operable to move each bottle in the magazine downward along the ramp one bottle space during each vending operation; that delivery chute 28 and opening 8 provide means for removing the bottle from the last of such storage spaces; and that opening 7 and door 14 provide means for the insertion of an empty bottle into the first of such storage spaces; so that both full and empty bottles are stored in the same magazine, with the empty bottles occupying spaces vacated by full bottles as the machine is operated.

Figure 5:
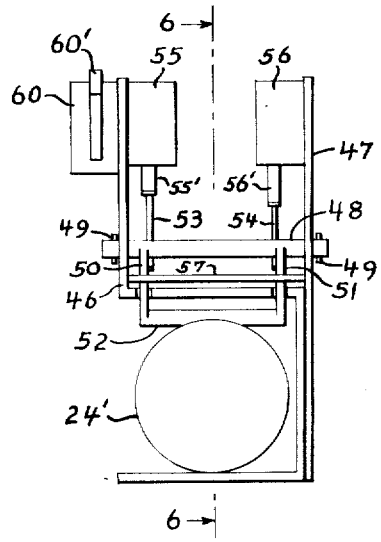
Fig. 5 is a front elevation, drawn to a much larger scale, of the empty bottle detector mechanism of the same machine.
Figure 6:
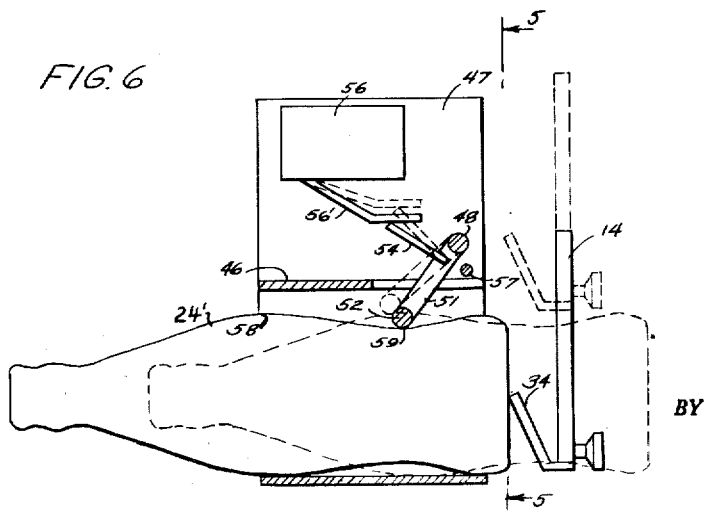
Fig. 6 is a section taken generally along the line 6—6 of Fig. 5.

The empty bottle detector shown generally at 35, Fig. 2, is better illustrated in Figs. 5 and 6, which also show door 14 and an inserted empty bottle 24'. The detector, which is actuated by the insertion of the empty bottle, preferably comprises two metal brackets 46 and 47, shaped as shown, welded together to form a rugged supporting structure which provides an upper compartment or space for mounting switches and a lower compartment or space for receiving the empty bottle 24'. The lower compartment is open at both ends and at its left-hand side, so that the bottle can be moved out sideways by operation of the vending drum 21. A rotatable or pivoted shaft 48 is mounted horizontally near the bottom of the upper compartment and may be held in place by a pair of pins 49. Two arms 50 and 51 are attached to shaft 48 and extend downward therefrom through slots in bracket 46 into the lower compartment. A horizontal cross bar 52 is attached to and connects the lower ends of arms 50 and 51. As shown in the drawing, bar 52 engages the upper side of bottle 24', and is displaced inward and upward an amount depending upon the diameter of the bottle. Two pins 53 and 54, rigidly attached to arms 50 and 51 respectively, operate the switch arms 55' and 56' of two switches 55 and 56. Switches 55 and 56 each have a movable switch blade which closes an upper set of contacts when the arm of the switch is raised, and switch 56 preferably also has a lower set of contacts closed by the switch blade when the switch arm is lowered. When no bottle is present in the lower compartment, arms 50 and 51 swing downward until they engage a stop 57.

Although useful with bottles of various shapes, the detector described is especially adapted for use with bottles having the shape illustrated, which comprises a relatively wide shoulder 58 and a narrower waist 59. In Fig. 6, the full lines represent the positions of the parts when the bottle 24' is fully inserted into the lower compartment, while the broken lines represent the positions of the parts when bottle 24' is inserted only part way. In the broken-line position, bar 52 engages bottle shoulder 58, and the blades of switches 55 and 56 are both moved upward to close the upper contacts of both switches. In the full-line position, bar 52 engages bottle waist 59 and the blade of switch 55 remains closed upward, but the blade of switch 56 has moved to its lower position and closes the lower set of contacts. When the bottle is removed, arm 51 swings downward into engagement with stop 57, and the blades of both switches are lowered.

A normally closed switch 60, shown in Figs. 2 and 5, is mounted so that its switch arm 60' engages the top of the sliding door 14 when service door 2 is closed. Whenever door 14 is opened, the arm 60' is pressed inward, and switch 60 is opened.

Referring to the circuit diagram, Fig. 7, the coin mechanism contained in box 38 may be a "7 cent sale, changer type" manufactured by National Rejectors Inc., with electrical circuit connections modified, as hereinafter described, to make a dual-price coin mechanism, initially responsive to a seven cent payment, but after actuation of the empty bottle detector responsive to a five cent payment. This mechanism comprises slug rejector, coin sorter, and change-making devices which need not be described for an understanding of the present invention, two coin-operated switches 61 and 62, a cent rejector 63 operated by a solenoid 64, a nickel rejector 65 operated by a solenoid 66, a dime rejector 67 operated by a solenoid 68, a quarter rejector 69 operated by a solenoid 70, and a payout mechanism 71 operable to deliver change only when a solenoid 72 is energized through a circuit including one or more switches 73 which are closed upon receipt of a dime or a quarter. Alternatively, solenoid 70 may be omitted and rejectors 67 and 69 both operated by solenoid 68.

The coin rejectors 63, 65, 67 and 69 prevent the receipt of cents, nickels, dimes and quarters, respectively, unless their respective operating solenoids are energized. The blade of switch 61 is biased upward to the position shown and is closed downward momentarily by each alternate cent received; and the blade of double-throw switch 62 is biased upward to the position shown and is moved downward momentarily by each nickel, dime or quarter received. When a dime is received, payout mechanism 71 delivers one nickel change. When a quarter is received, payout mechanism 71 delivers four nickels change. When the payout mechanism has insufficient nickels to make proper change, the blade of a double-throw switch 74 is moved to the right. When the payout mechanism is inoperative for other reasons, the blade of a double-throw switch 75 is moved to the right. If the coin-changer provisions are not desired, the dime, quarter, and payout mechanisms may be omitted. Since coin mechanisms of this type are well known to those skilled in the art, a more detailed description is omitted.

Figure 7:
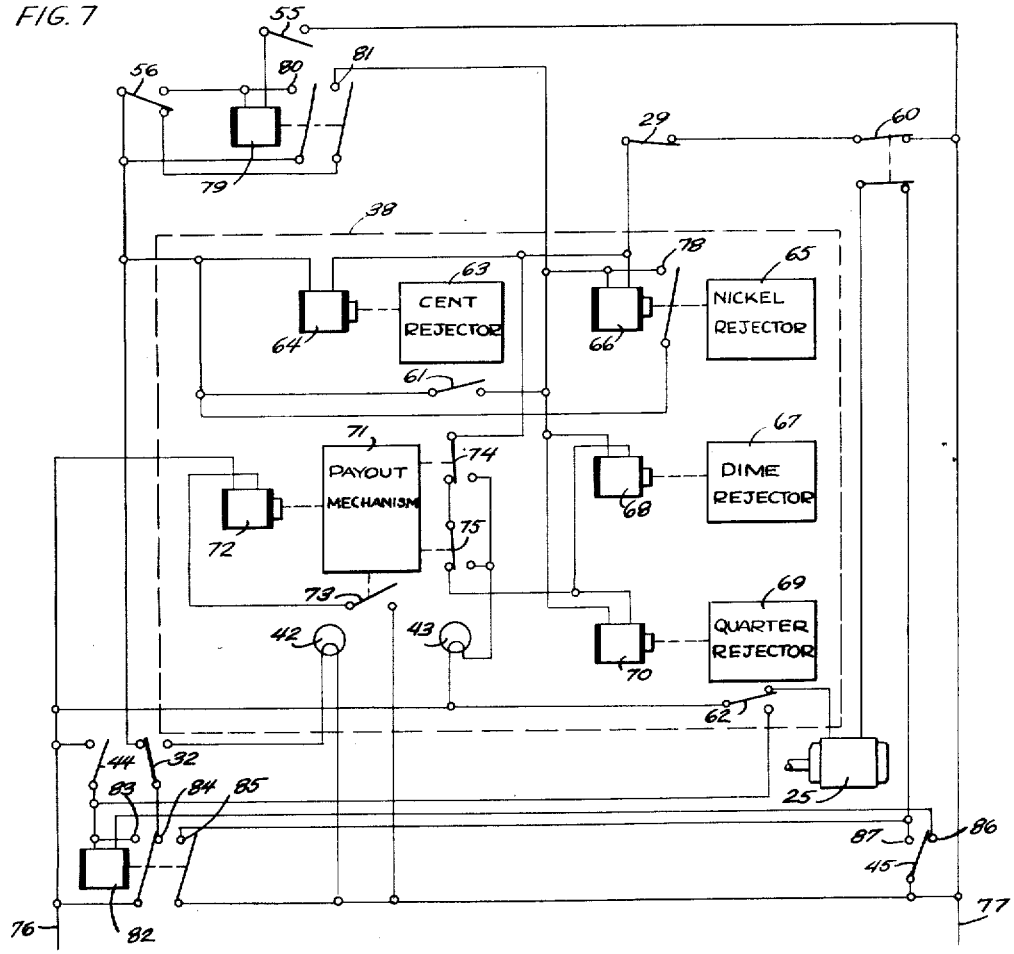
Fig. 7 is a circuit diagram of the same machine.

Between vending operations, the several switch blades and relay armatures are normally in the positions shown in Fig. 7. Electric power from a standard commercial outlet is supplied through connections 76 and 77, across which other electrical components are connected as shown in the drawings. Since solenoid 64 is initially energized by the circuit connections shown in Fig. 7, while solenoids 66, 68 and 70 are initially de-energized, the coin mechanism initially will receive cents but will reject nickels, dimes and quarters. The second cent received momentarily closes coin-operated switch 61, and thereby closes a circuit which energizes solenoids 66, 68, 70. A holding contact 78 operated by solenoid 66 closes a circuit which bypasses switch 61, so that solenoids 66, 68 and 70 remain energized after switch 61 reopens. The coin mechanism will now receive nickels and will also receive dimes and quarters provided switches 74 and 75 are in the positions shown.

The blade of switch 75 is moved to the right whenever a motor (not illustrated) operating the payout mechanism is in operation. Switch 74 is connected to a change receptacle, and its blade is moved to the right whenever there is insufficient change available for proper operation of the change-making device. In either of these events, signal lamp 43 is lit, solenoids 68 and 70 are de-energized, and the machine will reject dimes and quarters.

When a nickel, dime or quarter is received, the blade of coin-operated switch 62 is momentarily moved downward, and a vending operation is initiated as hereinafter explained. After a dime or quarter is received, the payout mechanism 71 delivers the proper amount of change to opening 6 at the front of the vending machine. Thus a vending operation may be initiated upon receipt of a net payment amounting to seven cents, without the use of an empty bottle.

Now assume that an empty bottle 24' is inserted through door 14 (see Fig. 6). Whenever door 14 is opened, the double-pole switch 60 opens, the circuit to vending motor 25 is broken to render the vending mechanism inoperative, and solenoids 64, 66, 68 and 70, connected in series circuit relation with switch 60, are de-energized so that the machine will reject all coins while the door is open. As the shoulder 58 of the bottle passes under the bar 52 (see Fig. 6, broken-line position), the blades of switches 55 and 56 are both moved upward to close a circuit which energizes a relay 79. When the bottle is fully inserted (see Fig. 6, full-line position), the blade of switch 55 remains closed upward, but the blade of switch 56 returns to its lowered position. Relay 79 is kept energized by the circuit through a holding contact 80. A circuit is now closed through the lower contact of switch 56 and a relay contact 81 which by-passes switch 61, but reject solenoids 66, 68 and 70 remain de-energized until door 14 and switch 60 are closed. After door 14 is closed, the reject solenoids are energized and the machine will receive a nickel, dime or quarter to initiate a vending operation. Thus, when an empty bottle is reurned to the machine, a vending operation is initiated upon a net payment amounting to five cents; while without the empty bottle a net payment amounting to seven cents is required.

It will be understood that reference herein made to cents, nickels, dimes and quarters is illustrative only, and that coins of other denominations and other net amounts to be paid may be used when an appropriate coin mechanism is employed.

The empty bottle detector has considerable discrimination with respect to the size and shape of the bottles accepted. Unless the bottle has a sufficiently wide shoulder, the blade of switch 56 will not be closed upward, and relay 79 will not be energized. Then, unless the bottle is sufficiently narrower at its waist, the blade of switch 56 will not return to its lower position, and the circuit to energize the reject solenoids will not be completed. On the other hand, if the bottle is too narrow at the waist, switch 55 will reopen and relay 79 will be de-energized. Also, if the bottle is removed before closing the door 14, switch 55 will reopen and de-energize relay 79. If, after energizing solenoids 66, 68 and 70, but before inserting a nickel, dime or quarter, door 14 is reopened to remove the empty bottle, the solenoids will be de-energized by the opening of switch 60, and nothing will have been accomplished.

Coin-operated switch 62 of the coin mechanism controls the vending mechanism. When the blade of switch 62 is closed downward momentarily, the vending cycle is initiated by completion of a circuit to energize a vending relay 82. Holding contact 83 keeps relay 82 energized after the blade of switch 62 returns to its initial position. Relay contact 84 is opened, thereby de-energizing solenoids 64, 66, 68 and 70 so that no coins can be received while a vending operation is in progress. Relay 79 is also de-energized, and the empty bottle detector is reset for the next operation.

As soon as the blade of switch 62 returns to its upper position, contact 85 of relay 82 completes a circuit to vending motor 25, which operates to rotate the vending drum 21. As soon as the next fin 22 passes under the arm of the switch 45 (see Fig. 2), the blade of switch 45 is moved to the left (Fig. 7), switch contact 86 is opened, and relay 82 is de-energized. However, switch contact 87 is now closed and completes another circuit to motor 25, so that the motor continues to rotate drum 21 until the fin 22 passes from under the arm of switch 45, and the blade of switch 45 returns to its initial position. Alternatively, switch 45 may be constructed so that contact 86 is closed when fin 22 is under the switch arm, and contact 87 is closed when fin 22 passes from under the switch arm. Each vending cycle will then end with a fin under the switch arm, but operation will otherwise be the same.

This vending circuit is exceptionally simple and reliable. Since the blade of switch 62 must return to its initial position before motor 25 starts, no "jackpotting," or repeated vending due to sticking of the coin switch 62, is possible. The positive actuation of switch 45 by fins 22 insures that the vending operation will always end at a correct drum position.

When a bottle moves into the delivery chute, switch 29 is opened and reject solenoids 64, 66, 68 and 70 remain de-energized until the bottle is removed. When the last full bottle has been vended, the bottle space adjacent to the lower end of the ramp is empty, and the blade of "empty" switch 32 is moved to the right from the position shown in Fig. 7. This de-energizes the reject solenoids, so that the machine will reject all coins, and also lights signal lamp 42.

When the normally-open switch 44 is manually closed, relay 82 is energized independently of the coin mechanism. This provides manually controlled means for operating vending motor 25 to facilitate filling or servicing the machine. Switch 44 is inaccessible when service door 2 is closed and locked (see Fig. 2).

Figure 8:
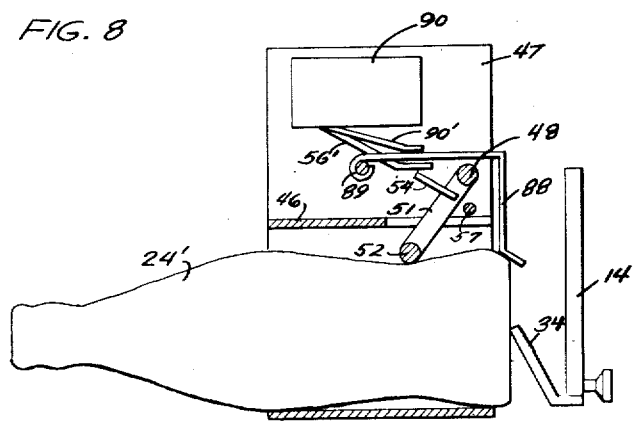
Fig. 8 is a schematic view of an alternative empty bottle detector mechanism.

An alternative empty bottle detector mechanism is illustrated in Fig. 8. This alternative detector comprises parts identical to those previously described in connection with Figs. 5 and 6, which for clarity bear the same reference numbers previously used, and additional parts which will now be described. A part 88 pivotably supported by a pin 89 is movable downward into that portion of the lower compartment adjacent to door 14 to engage the butt of the inserted empty bottle 24', as shown. When door 14 is opened, cam 34 engages the lower right portion of part 88 and lifts it out of the lower compartment. When the door is closed, part 88 moves downward until it engages the butt of the bottle, which limits its downward movement. If no bottle is present in the lower compartment, part 88 continues to move donward until it engages shaft 48.

Movement of part 88 operates the actuating arm 90' of an additional switch 90 which is mounted between detector switches 55 and 56. Preferably, switch 90 is closed when part 88 is raised by the opening of the door, and remains closed when part 88 is raised by the opening of the door, and remains closed when part 88 engages a bottle of the desired size, but is opened by any greater movement downward of part 88. If desired, another additional switch (not illustrated) may be added which is opened by upward movement of part 88 from its bottle-engaging position, and is electrically connected in series with switch 90. The provision whereby part 88 is lifted out of the lower compartment whenever door 14 is opened makes malicious tampering with the detector mechanism much more difficult than it would otherwise be.

Figure 9:
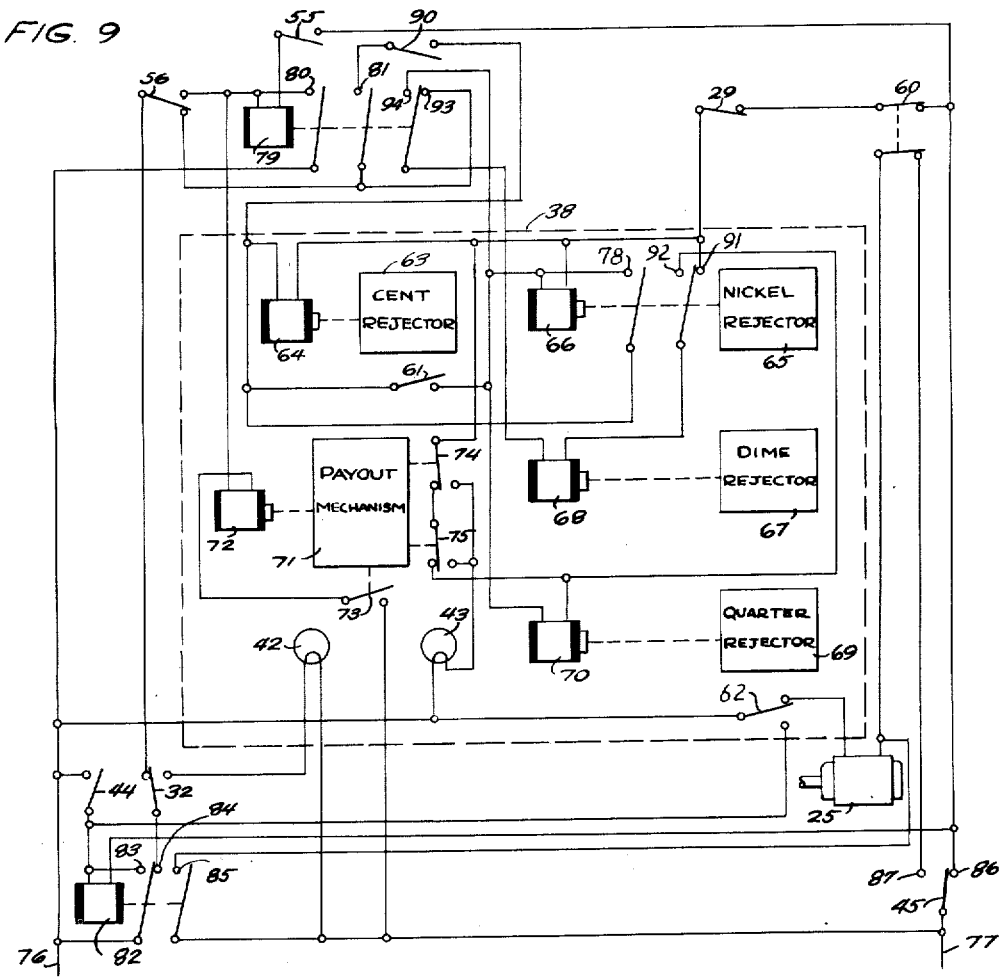
Fig. 9 is an alternative circuit diagram.

An alternative circuit, which includes provisions for using the detector shown in Fig. 8, is illustrated in Fig. 9. Parts identical to those previously described bear the same reference numbers. The switch 90 is connected in series with relay contact 81, so that the circuit which includes contact 81 is not closed unless switch 90 remains closed after relay 79 is energized and switch 56 returns to its lowered position. If, for example, an attempt is made to defraud the machine by using a stick or similar object, instead of an empty bottle, to actuate detector bar 52, downward movement of part 88 will not be properly limited when door 14 is closed, switch 90 will open, and the detector circuit will not energize the coin rejector solenoids.

In Fig. 9, the coin mechanism parts within box 38 are similar to those previously described, but the circuit connections have been changed to provide a somewhat different mode of operation requiring a net payment of seven cents with an empty bottle, or ten cents without an empty bottle. Additional contacts 91 and 92 controlled by solenoid 66 have been added to the coin mechanism, and additional relay contacts 93 and 94 have been added to the detector relay 79. With the connections shown, solenoid 68 is initially energized, while solenoids 64, 66, 70 and 72 are initially de-energized. Thus, initially, without insertion of an empty bottle, the machine will receive a dime and thereupon deliver a full bottle, but will reject coins of all other denominations. Since the circuit to solenoid 72 is open at switch 56, solenoid 72 is de-energized and the payout mechanism 71 is inoperative to deliver change.

When an empty bottle is received, relay 79 is energized as previously explained, and the circuit including the lower contact of switch 56, contact 81 and switch 90 is closed. After door 14 and switch 60 are closed, this circuit energizes solenoid 64 and the coin mechanism will receive cents. Also, when relay 79 is energized, relay contact 93 is opened, whereby solenoid 68 is de-energized and the coin mechanism will reject dimes. At the same time, relay contact 94 is closed to connect solenoid 68 in parallel with solenoids 66 and 70, and solenoid 72 is connected to line 76 through relay holding contact 80.

The second cent received closes coin switch 61 momentarily, and energizes solenoids 66, 68 and 70. The coin mechanism will now receive a nickel, dime or quarter, and thereupon initiate a vending operation. Since solenoid 72 can now be energized by closing switch 73, payout mechanism 71 operates to deliver one or four nickels change upon receipt of a dime or a quarter, respectively. Thus, when an empty bottle is returned to the machine, a vending operation is initiated upon a net payment amounting to seven cents; while without an empty bottle, payment of a dime is required.

When the payout mechanism is inoperative, the blade of either switch 74 or switch 75 is moved to the right as previously explained. This always deenergizes solenoid 70 to prevent the receipt of quarters. When an empty bottle plus two cents has been received, solenoid 66 is energized, and solenoid 68 is connected to switches 74—75 through contact 92, so that moving the blade of either switch 74 or switch 75 to the right de-energizes solenoid 68 and prevents the receipt of dimes. However, under initial conditions when no empty bottle has been received, it is desirable that dimes may be received although mechanism 71 may be inoperative. For this purpose, solenoid 68 is connected to line 77 through a circuit including the initially closed contact 91.

To insure sufficient time for operation of the payout mechanism 71 when change is to be delivered, the relay holding contact 80 is connected when closed directly to line 76, rather than through the circuit including contact 84 as in Fig. 7. In the Fig. 9 circuit, relay 79 is not de-energized by operation of relay 82 at the beginning of a vending operation. The circuit from relay 79 through switch 55 connects with line 77 through contact 86, so that relay 79 is de-energized nearer the end of the vending operation when switch 45 is actuated by a fin 22.

The lower blade of double-pole switch 60 is also connected differently than was shown in Fig. 7. In the Fig. 9 circuit, opening door 14 does not stop motor 25 until the blade of switch 45 moves to the left and de-energizes relay 82. At this time drum 21 has moved far enough to prevent removal of the empty bottle, and the possibility of defrauding the machine is reduced.

When a mechanism is desired requiring a net payment amounting to five cents with an empty bottle, or one dime without an empty bottle, the circuit through switch 61 of Fig. 9 can be closed permanently, and the cent provisions may be omitted. Solenoid 66 will then be energized to permit receipt of nickels immediately after the receipt of an empty bottle and the closing of door 14. Whenever desired, the quarter provisions may be omitted.

Another alternative empty bottle detector mechanism is illustrated in Fig. 10. This mechanism is identical to that illustrated in Figs. 5 and 6, and previously described, except that an additional switch 95 has been mounted on door 14 in the manner illustrated. When an empty bottle has been inserted and door 14 is closed, the operating arm 95' of switch 95 engages the butt end of the bottle and closes switch 95. Whenever door 14 is opened, or is closed with no empty bottle present, switch 95 is open.

Another alternative circuit, with which the Fig. 10 detector may be used, is illustrated in Fig. 11. This circuit is simpler than those previously described in that no means corresponding to relay 79 is provided. Consequently, the detector is not responsive to the shoulder width of the bottle. When a bottle of the desired size is fully inserted, detector bar 52 is moved by engagement with a side of the bottle to a position such that initially open switch 55 is closed, and initially closed-downward switch 56 remains closed. When door 14 is closed, switch arm 95' engages the butt of the bottle and closes switch 95.

In Fig. 11, the box 38 contains a simpler coin mechanism than those previously described herein. This mechanism comprises a nickel rejector 96 which prevents the receipt of nickels when a solenoid 97 is de-energized, an initially closed contact 98 which is opened by solenoid 97 when the latter is energized, a dime rejector 99 which prevents the receipt of dimes when a solenoid 100 is de-energized, and a coin switch 101 the blade of which is moved downward to close a lower set of contacts momentarily by each nickel or dime received.

Initially, solenoid 97 is de-energized and solenoid 100 is energized. Consequently, the coin mechanism will reject nickels, but will receive a dime and initiate a vending operation through operation of coin switch 101. When an empty bottle of the desired size has been received, the detector circuit is closed and solenoid 97 is energized. This opens contact 98 and solenoid 100 is de-energized. Consequently, the coin mechanism will now reject dimes, but will receive a nickel and initiate a vending operation. Thus, a vending operation is initiated upon receipt of a nickel and an empty bottle; or upon receipt of a dime without an empty bottle.

When the blade of coin switch 101 is moved downward to the lower switch contact, vending relay 82 is energized. Then, when the blade of coin switch 101 returns to its initial position, a circuit is completed to vending motor 25, and the vending operation proceeds in the manner previously described.

In this circuit, switch 60 is connected in series with relay 82, so that if door 14 is opened after the vending operation starts, not only will motor 25 stop, but also relay 82 will be de-energized, and the vending operation will not be completed until another coin is inserted. This arrangement provides additional security against fraud through attempts to retrieve the empty bottle from the machine after a vending operation has started.

Figure 12:
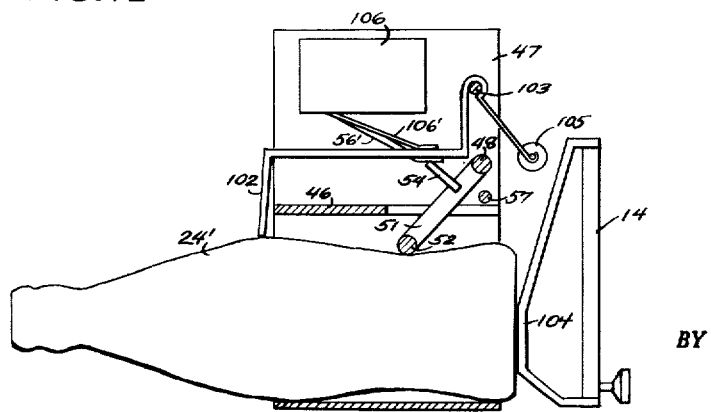
Fig. 12 is a schematic view of another alternative empty bottle detector mechanism.

Another alternative empty bottle detector mechanism is illustrated in Fig. 12. In addition to parts identical to parts previously described and bearing the same reference numerals, this mechanism comprises a part 102 pivotably supported on a pin 103 and movable downward into a portion of the lower compartment remote from door 14. Attached to door 14 is a cam 104 which serves two purposes. When door 14 is closed, the lower portion of cam 104 engages the butt of the botle 24' and insures that the bottle is fully inserted into the detector mechanism. When door 14 is opened, the upper portion of cam 104 engages a roller 105 attached to the right end of part 102, moves roller 105 to the left and rotates part 102 about pin 103, and thus lifts the left end of part 102 out of the lower compartment. When door 14 is closed, the left end of part 102 moves downward, and this downward movement is limited by engagement with the shoulder of fully-inserted bottle 24'.

Movement of part 102 operates the arm 106' of a switch 106 mounted between switches 55 and 56, and preferably also operates the arm of another switch 107 (not shown in Fig. 12) similarly mounted alongside switch 106. When part 102 engages the shoulder of a bottle of the desired size, switches 106 and 107 are preferably both closed; movement of part 102 downward from this position opens switch 106, and movement upward opens switch 107.

Figure 13:
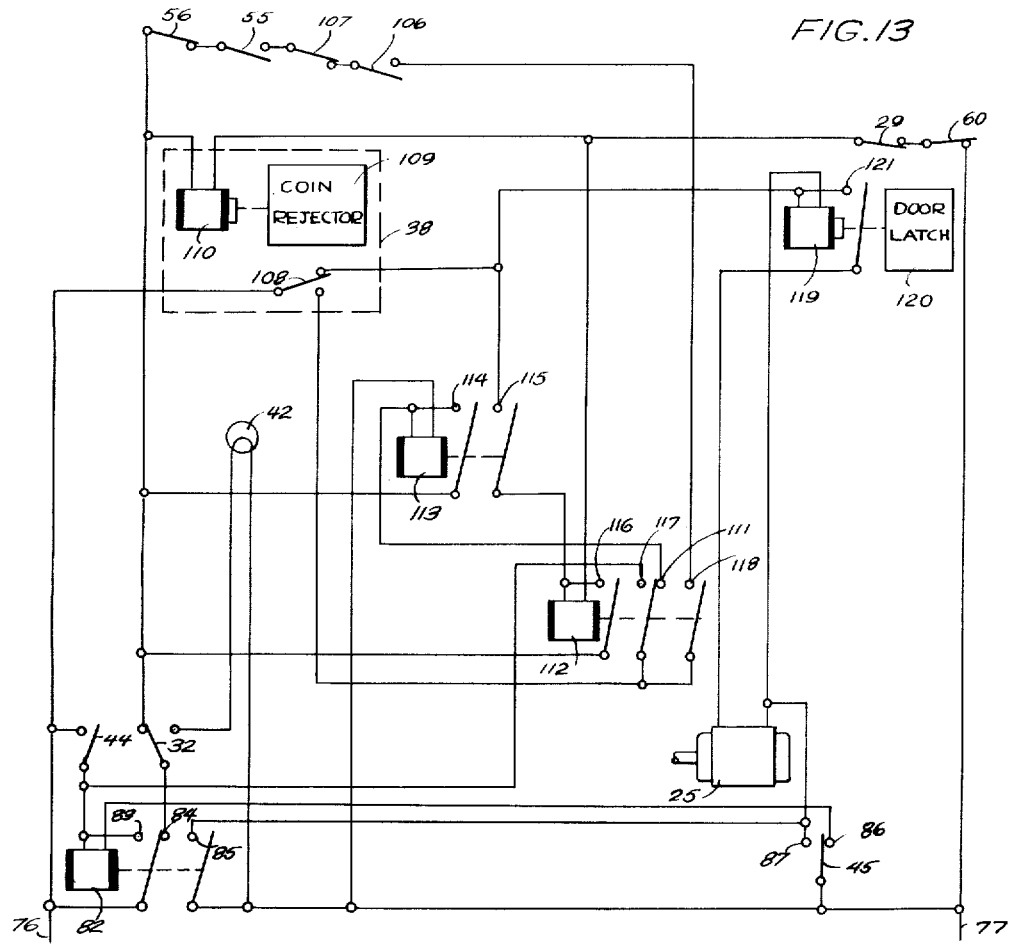
Fig. 13 is another alternative circuit diagram.

Another alternative circuit, with which the Fig. 12 detector may be used, is illustrated in Fig. 13. The detector switches 55, 56, 106 and 107 are all closed only when a bottle has been inserted which has both a waist of the desired size and a shoulder of the desired size. The detector switches are connected in series, so that when any detector switch is open, the detector circuit is open.

In this embodiment, the coin mechanism within box 38 is a very simple type which receives coins of only one denomination—nickels for example. Each nickel received moves the upwardly-biased blade of a coin switch 108 downward momentarily. A coin rejector 109 controlled by a solenoid 110 prevents the receipt of coins when door 14 is open (switch 60 open), when a bottle is in the edlivery chute (switch 29 open), when a vending operation is in progress (relay contact 84 open) or when the machine is empty (switch blade 32 moved to the right).

When a first nickel is received, the blade of switch 108 is moved downward and closes a circuit through a contact 111 of a relay 112 to energize another relay 113. When the blade of switch 108 returns to its initial position, relay 113 is kept energized by a circuit through its holding contact 114, and a circuit through switch 108 and relay contact 115 is closed to energize relay 112. Thus the first nickel energizes both relays.

When a second nickel is received and the blade of switch 108 is again moved downward, relay 112 is kept energized by its holding contact 116, and a circuit is closed through switch 108 and relay contact 117 to energize vending relay 82 and initiate a vending operation. Thus, a vending operation may be started by payment of two nickels, without insertion of an empty bottle.

When an empty bottle of proper size and shape has been inserted, a circuit is closed through the detector switches to relay contact 118. The first nickel received, whether inserted before or after the empty bottle, energizes relay 113. Now as soon as the blade of switch 108 returns to its initial position and door 14 is closed, relay 112 is energized and a circuit is closed through the detector switches and through relay contacts 118 and 117 to energize vending relay 82. Thus a vending operation may be initiated by payment of one nickel and the return of an empty bottle.

Since relay 112 is de-energized whenever switch 60 is open, a vending operation cannot be started until door 14 is closed. As soon as vending relay 82 is energized and coin switch 108 returns to its initial position, a circuit is completed through relay contact 85 to energize a solenoid 119 which operates a door latch 120. The latch 120 prevents the opening of door 14 while a vending operation is in progress.

When it operates the door latch, solenoid 119 also closes a contact 121 which completes a circuit to vending motor 25. The vending operation then proceeds in the manner previously described. As soon as vending relay 82 is energized, relays 112 and 113 are de-energized and reset for the next operation. When switch 45 opens contact 86 to de-energize relay 82, the circuit to motor 25 and latch solenoid 119 is closed through contact 87 until switch 45 returns to its initial position, whereupon motor 25 stops and latch solenoid 119 is de-energized to unlatch door 14.

Another alternative empty bottle detector mechanism is illustrated in Fig. 14. In addition to parts identical to parts previously described and bearing the same reference numerals, this mechanism comprises an arm 122 pivotably supported on shaft 48 and having attached to its lower left end a cross bar 123 which is movable downward in the lower compartment to engage the shoulder of an inserted bottle 24'. The upper right end of arm 122 carries a roller 124 which engages a cam 125, attached to door 14, when door 14 is opened. A spring 126 biases the left end of arm 122 to move upward when door 14 is closed. Upward movement of arm 122 is preferably limited by a stop 127. Movement of arm 122 operates the actuating arm 128' of an additional switch 128 mounted between switches 55 and 56.

In Fig. 14, the full lines illustrate the positions of the parts when an empty bottle 24' is fully inserted into the detector; while the broken lines illustrate the positions of the parts when bottle 24' has been partially inserted and door 14 has been partially closed. When door 14 is opened, cam 125 moves roller 124 to the left and slightly upward, and thereby moves arm 122 to the broken-line position shown in Fig. 14. In this position, bar 123 acts as a stop effective to prevent insertion of bottle 24' further than the broken-line position illustrated. Bar 52 engages the shoulder of the bottle 24', whereby the blades of switches 55 and 56 are both moved upward as previously explained, and switch 128 is open.

When door 14 is partially closed, to the broken-line position shown in Fig. 14, the lower portion of the door covers a substantial part of the butt of bottle 24', and prevents removal of the bottle without reopening the door. When door 14 is lowered a slight amount further, cam 125 disengages roller 124, and spring 126 moves the left end of arm 122 upward to the position shown by full lines in Fig. 14. In this full-line position, switch 128 is closed, and bar 123 is ineffective to prevent further insertion of bottle 24'. As door 14 is lowered further to the fully-closed position illustrated by full lines, cam 125 engages the butt end of bottle 24' and moves the bottle to the fully inserted position, whereupon bar 52 moves downward to engage the waist of the bottle and switch 56 is returned to its lowered position. Thereafter, engagement of bar 123 with the shoulder of bottle 24' locks arm 122 in the full-line position, and roller 124 and cam 125 prevent door 14 being reopened more than part way until bottle 24' is removed from the detector by the vending mechanism.

Stationary cross bars 129 and 130 may be provided to insure that bottle 24' is inserted in a substantially horizontal position. Also, a small extension 46' may be added to the lower portion of member 46, as shown, to support the butt of bottle 24' when in its partially-inserted position.

Another alternative circuit, with which the Fig. 14 detector may be used, is illustrated in Fig. 15. When detector bar 52 engages the shoulder of inserted bottle 24' (see Fig. 14), the blades of switches 55 and 56 are both moved upward, but relay 79 remains de-energized while double-pole switch 128 is open. When door 14 is closed far enough for cam 125 to disengage roller 124, switch 128 is closed, and relay 79 is energized, provided bar 52 still engages a bottle shoulder of the desired size. Further closing of door 14 moves the bottle 24' to the fully-inserted position, whereupon bar 52 engages the waist of the bottle, and, if the bottle waist is of the desired size, the blade of switch 56 returns to its lowered position and the detector circuit including contact 81 is closed.

In the embodiment illustrated by Fig. 15, the coin mechanism within box 38 is of a type which receives coins of a single denomination—nickels, for example. A coin rejector 131 operated by a solenoid 132 is provided to reject coins whenever door 14 is open (switch 128 open), or a bottle is in the delivery chute (switch 29 open), or a vending operation is in progress (contacts 84 or 86 open), or the machine is empty (switch blade 32 moved to the right). Coins which are received are directed along first and second paths to pass through either of two coin chutes 133 and 134, selectively, as is hereinafter explained.

A coin-deflecting member 135 is pivoted at 136 and is movable to either of two positions, selectively, its initial position being illustrated by full lines and its second position being illustrated by broken lines in Fig. 15. In the initial or full-line position of member 135, a received coin is deflected toward the left, whereupon the weight and momentum of the coin rotates member 135 to its broken-line position and the coin enters chute 133. In the second or broken-line position of member 135, a received coin is deflected toward the right, whereupon the weight and momentum of the coin rotates member 135 to its initial full-line position and the coin enters chute 134. Each coin which passes through chute 134 momentarily moves downward the blade of a coin switch 137 and thereby energizes vending relay 82 to initiate a vending operation as previously explained. Thus a vending operation can be initiated by a payment of two nickels, without the use of an empty bottle.

When an empty bottle is received and door 14 is closed, the detector circuit including switch 56 and relay contact 81 is closed to energize a solenoid 138. The solenoid then lowers the left end of a lever 139 pivoted at 140. The right end of lever 139 raises an ear 141 of pin 142. As pin 142 rises, it rotates member 135 from its initial full-line position to its broken-line position. Near the top of its upward movement, the slanted upper edge of ear 141 engages a stationary pin 143, whereupon ear 141 is deflected toward the right and slips off the end of lever 139. A spring 144 then returns pin 142 to its initial position. Solenoid 138 remains energized until a vending operation is initiated, whereupon contact 84 is opened to reset relay 79 and solenoid 138. When solenoid 138 is de-energized, spring 145 returns lever 139 to its initial position. As the right end of lever 139 moves downward, its slanted lower edge engages the slanted upper edge of ear 141 and moves the ear sufficiently to the right momentarily for lever 139 to re-engage the lower edge of ear 141, so that the mechanism is reset for the next operation.

After member 135 is moved to its broken-line position, either by receipt of a coin or by receipt of an empty bottle, the next coin received will enter chute 134 and initiate a vending operation. Thus a vending operation can be initiated by a payment of two nickels without an empty bottle, or by insertion of an empty bottle and a payment of one nickel.

It will be understood that respective features of the specific embodiments herein illustrated and described may be combined in many other ways to form additional alternative embodiments, and that other changes and modifications may be made without departing from the true spirit and scope of the invention defined by the following claims.

I claim:

1. A bottle vending machine comprising vending mechanism operable to deliver a full bottle, means for receiving an empty bottle, a detector actuated by receipt of the empty bottle, means for receiving coins, coin mechanism controlling operation of said vending mechanism, said coin mechanism being initially responsive to receipt of a first amount of coins to initiate a vending operation, and means responsive to actuation of said detector to render said coin mechanism responsive to receipt of a smaller, second, amount of coins.

2. A bottle vending machine comprising vending mechanism operable to deliver a full bottle, means for receiving an empty bottle, a detector including at least one electrical switching means actuated by receipt of the empty bottle, an electrical circuit opened or closed selectively by operation of said switching means, means for receiving coins, dual-price coin mechanism responsive to the receipt of either of two amounts of coins selectively depending upon whether said electrical circuit is open or closed, said coin mechanism controlling operation of said vending mechanism to initiate a vending operation.

3. A bottle vending machine comprising a rotatable drum having a plurality of outwardly extending radial fins defining axial channels for engaging the neck ends of the bottles, a stationary spiral ramp around the periphery of said drum for supporting the body portions of the bottles, said drum and said ramp forming a magazine having a plurality of bottle storage spaces disposed successively along the length of said spiral ramp, vending mechanism operable to rotate said drum to move each bottle in the magazine to the next successive storage space, means for removing the bottle from the last of said storage spaces, means for inserting an empty bottle into the first of said storage spaces, a detector including at least one electrical switching means actuated by receipt of the empty bottle, an initially open electrical circuit closed by actuation of said switching means, means for receiving coins, dual-price coin mechanism responsive to receipt of a first amount of coins when said electrical circuit is open and responsive to receipt of smaller second amount of coins when said electrical circuit is closed, said coin mechanism controlling operation of said vending mechanism.

4. A bottle vending machine comprising vending mechanism operable to deliver a full bottle, means for receiving an empty bottle, a detector including a first electrical circuit closed by receipt of the empty bottle, means for receiving coins, means including a second electrical circuit closed by receipt of at least one coin, a solenoid energized by the closing of either of said first and second electrical circuits, and control means for said vending mechanism operable to initiate a vending operation upon the receipt of at least one coin after said solenoid is energized.

5. A bottle vending machine comprising vending mechanism operable to deliver a full bottle, means for receiving an empty bottle, a detector including an initially open first electrical circuit closed by receipt of the empty bottle, means for receiving coins, means including an initially open second electrical circuit closed by receipt of at least one coin of a first denomination, an electrically operated coin rejector, said rejector being initially de-energized and when de-energized preventing receipt of coins of a second denomination, means energizing said rejector upon the closing of either of said first and second electrical circuits, and means controlling said vending mechanism to initiate a vending operation upon receipt of at least one coin of said second denomination.

6. A bottle vending machine comprising a magazine having a plurality of successive storage spaces for the bottles, motor means operable to move each bottle in the magazine to the next successive storage space, means for removing the bottle from the last of said storage spaces, means for inserting an empty bottle into the first of said storage spaces, a detector including an initially open first electrical circuit closed by insertion of the empty bottle, means for receiving coins, means including a normally open second electrical circuit momentarily closed by the receipt of at least one cent, at least one coin rejector including an initially de-energized solenoid, said rejector preventing receipt of coins other than cents when said solenoid is de-energized, means energizing said solenoid upon the closing of either of said first and second electrical circuits, means including a holding contact operated by said solenoid to prevent de-energization of the solenoid upon subsequent reopening of said second electrical circuit, a normally open third electrical circuit momentarily closed by receipt of a coin other than a cent, and means controlled by the closing of said third electrical circuit to de-energize said solenoid and to initiate operation of said motor means.

7. A bottle vending machine comprising vending mechanism operable to deliver a full bottle, means for receiving an empty bottle, a detector actuated by receipt of the empty bottle, means for receiving coins of at least two denominations, means preventing receipt of coins of the smaller of said two denominations until said detector is actuated, and means controlling said vending mechanism to initiate a vending operation upon receipt of at least one coin of either of said two denominations.

8. A bottle vending machine comprising vending mechanism operable to deliver a full bottle, means for receiving an empty bottle, a detector actuated by receipt of the empty bottle, means for receiving coins, means preventing receipt of nickels until said detector is actuated, change mechanism operable to deliver a nickel change upon receipt of a dime, means rendering said change mechanism inoperative until an empty bottle is received, and means controlling said vending mechanism to initiate a vending operation upon receipt of either a nickel or a dime.

9. A bottle vending machine comprising vending mechanism operable to deliver a full bottle, means for receiving an empty bottle, a detector actuated by receipt of the empty bottle, means for receiving coins of at least three denominations, means preventing receipt of coins of a first of said three denominations until said detector is actuated, means preventing receipt of coins of a second of said three denominations until receipt of at least one coin of said first denomination, means preventing receipt of coins of the third of said three denominations after said detector is actuated until receipt of at least one coin of said first denomination, payout mechanism for delivering change upon receipt of a coin of said third denomination, means rendering said payout mechanism inoperative to deliver change until said detector is actuated, and means controlling said vending mechanism to initiate a vending operation upon receipt of a coin of either of said second and third denominations.

10. A bottle vending machine comprising a magazine having a plurality of successive storage spaces for the bottles, motor means operable to move each bottle in the magazine to the next successive storage space, means for removing the bottle from the last of said storage spaces, means for inserting an empty bottle into the first of said storage spaces, a detector actuated by insertion of the empty bottle, means for receiving coins, coin rejector means including an initially de-energized first solenoid to prevent receipt of cents until said first solenoid is energized, coin rejector means including an initially de-energized second solenoid to prevent receipt of nickels until said second solenoid is energized, coin rejector means including an initially energized third solenoid to prevent receipt of dimes unless said third solenoid is energized, circuit means to energize said first solenoid and de-energize said third solenoid upon actuation of said detector, circuit means to energize said second and third solenoids upon receipt of at least one cent, payout mechanism for delivering a nickel change upon receipt of a dime, means rendering said payout mechanism inoperative to deliver change until said detector is actuated, and means to de-energize all of said solenoids and to initiate operation of said motor upon receipt of either a nickel or a dime.

11. A bottle vending machine comprising vending mechanism operable to deliver a full bottle, means for receiving an empty bottle, a detector actuated by receipt of the empty bottle, means for receiving nickels and dimes, means preventing receipt of nickels until said detector is actuated, means preventing receipt of dimes after said detector is actuated, and means controlling said vending mechanism to initiate a vending operation upon receipt of either a nickel or a dime.

12. A bottle vending machine comprising a magazine having a plurality of successive storage spaces for the bottles, vending mechanism operable to move each bottle in the magazine to the next successive storage space, means for removing the bottle from the last of said storage spaces, means for inserting an empty bottle into the first of said storage spaces, a detector including an initially open electrical circuit closed by insertion of the empty bottle, means for receiving two denominations of coins, a coin rejector including an initially de-energized first solenoid for rejecting coins of the smaller of said two denominations until said first solenoid is energized, a coin rejector including an initially energized second solenoid for rejecting coins of the larger of said two denominations when said second solenoid is de-energized, circuit means for energizing said first solenoid and de-energizing said second solenoid upon the closing of said electrical circuit, and means controlling said vending mechanism to initiate a vending operation upon receipt of a coin of either of said two denominations.

13. A bottle vending machine comprising vending mechanism operable to deliver a full bottle, means for receiving an empty bottle, a detector actuated by receipt of the empty bottle, means for receiving coins, means controlling operation of said vending mechanism to initiate a vending operation upon receipt of two coins without actuation of said detector, and means to initiate a vending operation upon receipt of one coin and actuation of said detector.

14. A bottle vending machine comprising vending mechanism operable to deliver a full bottle, means for receiving an empty bottle, a detector actuated by receipt of the empty bottle, means for receiving coins, means including a switch operated by each coin received, initially de-energized relay means, means to energize said relay means upon a first operation of said switch, means controlling said vending mechanism to initiate a vending operation upon a subsequent operation of said switch without actuation of said detector, and means to initiate a vending operation after the first operation of said switch and actuation of said detector.

15. A bottle vending machine comprising a magazine having a plurality of successive storage spaces for the bottles, a motor operable to move each bottle in the magazine to the next successive storage space, means for removing the bottle from the last of said storage spaces, means for inserting an empty bottle into the first of said storage spaces, a detector including an initially open electrical circuit closed by insertion of the empty bottle, means for receiving coins, a switch member biased to a first position and operable to a second position, means operating said switch member to its second position momentarily upon receipt of each coin, an initially de-energized first relay, circuit means for energizing said first relay upon a first operation of said switch member in its second position, holding means for keeping said first relay energized, an initially de-energized second relay, circuit means for energizing said second relay upon said switch member returning to its first position after said first relay is energized, holding means for keeping said second relay energized, an initially de-energized third relay, means for energizing said third relay upon operation of said switch member to its second position after said second relay is energized, means for energizing said third relay upon energization of said second relay and closing of said electrical circuit of the detector, means for de-energizing said first and second relays upon energization of said third relay, and means operated by the energization of said third relay for controlling said motor to initiate a vending operation.

16. A bottle vending machine comprising vending mechanism operable to deliver a full bottle, means for receiving an empty bottle, a detector actuated by receipt of the empty bottle, means for receiving coins, a coin-deflecting member movable to first and second positions selectively, said deflecting member in its first position directing coins along a first path and in its second position directing coins along a second path, each coin received moving said deflecting member from one to the other of its positions, means for moving said deflecting member to its second position upon actuation of said detector, and means for controlling said vending mechanism to initiate a vending operation upon each passage of a coin along said second path.

17. A bottle vending machine comprising a magazine having a plurality of successive storage spaces for the bottles, vending mechanism operable to move each bottle in the magazine to the next successive storage space, means for removing the bottle from the last of said storage spaces, means for inserting an empty bottle into the first of said storage spaces, a detector including an initially open electrical circuit closed by insertion of the empty bottle, means for receiving coins, first and second coin chutes, a coin-deflecting member movable to first and second positions respectively, said deflecting member in its first position directing coins into said first chute and in its second position directing coins into said second chute, each coin received moving said deflecting member from one to the other of its positions, means for moving said deflecting member to its second position upon closing of said electrical circuit, a switch operated by each coin directed into said second chute, and means controlling said vending mechanism to initiate a vending operation upon each operation of said switch.

18. A bottle vending machine comprising means for receiving coins, mechanism responsive to receipt of a first amount of coins to deliver a full bottle, electrical means effective when energized to render said mechanism responsive to receipt of a smaller second amount of coins, a cabinet having a door for the insertion of an empty bottle, means responsive to insertion of the empty bottle for energizing said electrical means, and means for de-energizing said electrical means when said door is opened.

19. In a machine having an opening for the endwise insertion of empty bottles, the combination of a bottle detector comprising means defining a space for receiving a bottle inserted through such opening, a part movable within said space to engage the inserted bottle, and an electrical switch operated by movement of said part; a door movable to open or close said opening selectively, said door including a cam engaging the butt end of the inserted bottle when said door is closed to insure that the bottle is fully inserted into said space; and means operated by movement of said door for withdrawing said part from said space when said door is opened.

20. In a bottle vending machine having an opening for the endwise insertion of empty bottles, the combination of a bottle detector comprising means defining a space for receiving a bottle inserted through such opening, a part movable downward into the portion of said space adjacent to said opening, downward movement of said part being limited by engagement with the butt of an inserted bottle, and an electrical switch operated by downward movement of said part beyond its bottle-engaging position; and a door movable to open or close said opening selectively, said door including a cam engaging the butt end of the inserted bottle when said door is closed to insure that the bottle is fully inserted into said space, said cam engaging said movable part when said door is opened to lift said part out of said space.

21. In a bottle vending machine having an opening for the endwise insertion of empty bottles, the combination of a bottle detector comprising means defining a space for receiving a bottle inserted through such opening, a door movable to open or close said opening selectively, said door including a cam-like part engaging the butt end of the inserted bottle when said door is closed to insure that the bottle is fully inserted into said space, and an electrical switch mounted on said door, said switch having an operating part which engages the butt of the inserted bottle when said door is closed.

22. In a bottle vending machine having an opening for the endwise insertion of empty bottles, each of said bottles having a shoulder adjacent to its neck end, the combination of a detector comprising means defining a space for receiving a bottle inserted through such opening, a part movable downward into the portion of said space remote from said opening, downward movement of said part being limited by engagement with the shoulder of an inserted bottle, and at least one electrical switch operated by movement of said part; a door movable to open or close said opening selectively, said door including a cam engaging the butt end of the inserted bottle when said door is closed to insure that the bottle is fully inserted into said space; and means operated by movement of said door for lifting said part out of said space when said door is opened.

23. In a bottle vending machine having means for receiving empty bottles of a desired size and shape, the desired bottle shape including a relatively wide shoulder and a narrower waist, the combination of means defining an opening for the endwise insertion of empty bottles; a bottle detector comprising means defining a space for receiving a bottle inserted through said opening, a member movable within said space, said member having an initial position when no bottle is present in said space, said member engaging the shoulder of a partially inserted bottle of the desired size and shape and thereby being moved to a first displaced position, said member engaging the waist of a fully inserted bottle of the desired size and shape and thereby being moved to a second displaced position, a first switch operated by movement of said member to said first displaced position, and a second switch operated by movement of said member to said second displaced position; a door movable to open or close said opening selectively, said door including a cam engaging the butt end of a partially-inserted bottle when said door is partially closed and moving the bottle to its fully-inserted position as the door is fully closed; a stop movable between effective and ineffective positions selectively, said stop in its effective position engaging the shoulder of a partially inserted bottle and being effective to prevent movement of the bottle to its fully-inserted position; and means moving said stop to its effective position when said door is opened and releasing said stop for return to its ineffective position when said door is closed.

24. Bottle receiving apparatus comprising means defining a bottle receiving space having an opening through which a bottle may be inserted, a door movable to open or close said opening selectively, a part movable within said space and into contact with the inserted bottle for gaging its size, and means withdrawing said part from said space when said door is open.

25. A bottle vending machine comprising vending mechanism operable to deliver a full bottle, means for receiving an empty bottle, a bottle detector actuated by receipt of the empty bottle, means for receiving coins of at least one denomination, dual-price coin-receiving and change-making mechanism controlling operation of said vending mechanism and returning change, and means operated by actuation of said bottle detector for selectively varying the amount of change returned, whereby a full bottle is vended at one net sales price when an empty bottle is returned and at a different net sales price without the return of an empty bottle.

References Cited in the file of this patent

UNITED STATES PATENTS

| | | |
|---|---|---|
| 1,560,242 | Jones | Nov. 3, 1925 |
| 1,772,408 | Womrath | Aug. 5, 1930 |
| 1,777,715 | Carroll | Oct. 7, 1930 |
| 1,901,528 | Olsen | Mar. 14, 1933 |
| 1,922,253 | McCormick | Aug. 15, 1933 |
| 1,949,283 | Murtaugh | Feb. 27, 1934 |
| 1,996,668 | Bliss | Apr. 2, 1935 |
| 2,000,519 | Johns | May 7, 1935 |
| 2,177,689 | Dalkin | Oct. 31, 1939 |
| 2,260,643 | Rosan | Oct. 28, 1941 |
| 2,464,737 | Wellekens | Mar. 15, 1949 |
| 2,555,486 | Harris | June 5, 1951 |
| 2,633,959 | Von Stoeser | Apr. 7, 1953 |
| 2,642,328 | Nystedt | June 16, 1953 |
| 2,667,631 | Schaurte | Jan. 26, 1954 |

UNITED STATES PATENT OFFICE
CERTIFICATE OF CORRECTION

Patent No. 2,804,958                        September 3, 1957

Bruce Garrard

It is hereby certified that error appears in the printed specification of the above numbered patent requiring correction and that the said Letters Patent should read as corrected below.

Column 7, line 12, for "donward" read -- downward --; lines 18 and 19, strike out "and remains closed when part 88 is raised by the opening of the door,"; column 9, line 38, for "botle" read -- bottle --; line 71, for "edlivery" read -- delivery --; column 12, line 69, before "smaller" insert -- a --; column 15, line 21, for "in its" read -- to its --.

Signed and sealed this 26th day of November 1957.

(SEAL)
Attest:

KARL H. AXLINE                                           ROBERT C. WATSON
Attesting Officer                                     Commissioner of Patents